United States Patent
An et al.

(10) Patent No.: US 6,392,724 B2
(45) Date of Patent: May 21, 2002

(54) LCD MODULE HAVING IMPROVED FIXING STRUCTURE

(75) Inventors: Sam-Young An; Yun-Ho Hwang, both of Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/790,884

(22) Filed: Feb. 23, 2001

(30) Foreign Application Priority Data

Feb. 24, 2000 (KR) .......................................... 2000-8969

(51) Int. Cl.$^7$ ............................................. G02F 1/1333
(52) U.S. Cl. .......................................................... 349/58
(58) Field of Search ....................... 362/31, 32; 349/65, 349/61, 62, 96, 58, 60; 385/146

(56) References Cited

U.S. PATENT DOCUMENTS 6,046,785 A * 4/2000 Won .............................. 349/58
6,147,725 A * 11/2000 Yuuki et al. ................... 349/65

* cited by examiner

Primary Examiner—William L. Sikes
Assistant Examiner—Tim Rude
(74) Attorney, Agent, or Firm—Long Aldridge & Norman LLP

(57) ABSTRACT

A liquid crystal display (LCD) module includes: a back light unit device having a) a lamp, b) a reflection sheet reflecting light from the lamp, c) a light guide positioned over the reflection sheet, the light guide having grooves at opposing sides, and d) a plurality of sheets located over the light guide, each sheet having a through hole corresponding to the grooves of the light guide; a liquid crystal panel located over the back light unit; a first frame located over the liquid crystal panel; a second frame having a) a main portion under the back light unit, b) first and second wall portion perpendicular to the main portion and disposed on sides of the main portion, and c) supporting portions extending outwardly from upsides of the first and second wall portions and parallel to the main portion, the supporting portion having first fastening means; and a fixing unit having a) pressing portions parallel to the supporting portions of the second frame, the pressing portions pressing down the grooves of the light guide, b) protrusions protruded upward from the pressing portions, the protrusions being inserted into the through holes of the plurality of sheets, and c) a connecting portion parallel to the supporting portion of the second frame, the connecting portion having a second fastening means fastening with the first fastening means of the second frame. Since the second frame is made from metal, heat transfer of the liquid crystal display module is better than in a conventional LCD module.

19 Claims, 4 Drawing Sheets

LCD MODULE HAVING IMPROVED FIXING STRUCTURE

CROSS REFERENCES TO RELATED APPLICATIONS

This application claims the benefit, under 35 U.S.C. § 119, of Korean Patent Application No. 2000-8969, filed on Feb. 24, 2000, the entirety of which is hereby incorporated by reference for all purposes as if fully set forth herein.

BACKGROUND OF THE INVENTION

1. Field of the invention

The present invention relates to a liquid crystal display (LCD) device, and more particularly, to a structure of a liquid crystal display module having metallic frames for fixing a back light unit and a liquid crystal display panel.

2. Description of Related Art

Liquid crystal displays (LCDs) are gaining in popularity for use in systems such as television receivers, computer monitors, avionics displays, aerospace displays, and other military-related displays where the elimination of cathode ray tube (CRT) technology is desirable for several reasons. In particular, CRTs are characterized by large depth dimensions, undesirably high weight, and fragility. Additionally, CRTs require a relatively high voltage power supply in order to sufficiently accelerate electron beams for displaying images.

The aforementioned shortcomings of CRTs are overcome by flat panel liquid crystal displays in which matrix arrays of liquid crystal picture elements or pixels are arranged in a plurality of rows and columns. In general, LCD devices have various advantages in comparison with CRT display devices in that they are thin in thickness and low in power consumption, etc. Therefore, such LCD devices might be expected to be substituted for CRT display devices and have been a matter of great interest in some industry fields.

In contrast to the CRT, the liquid crystal display device requires a light source, because the liquid crystal is not a fluorescent material. A cold cathode fluorescent lamp (CCFL), a hot cathode fluorescent lamp (HCFL) or the like is used as the light source of the liquid crystal display device. The lamp is included in a back light unit of the liquid crystal display device. Back light units are classified into direct back light type (or direct type) units and edge light type (or edge type) units, according to a position of the lamp.

In the case where the direct type back light unit is used for a liquid crystal display device, incident rays irradiating from a lamp are directly incident to a liquid crystal display panel after a diffusion sheet uniformly diffuses the incident rays. In the case where the edge type back light unit is used, rays from a lamp are incident to a liquid crystal display panel via a light guide. A detailed explanation of the edge type will be provided subsequently.

The edge type back light unit generally includes a lamp, a light guide on a side surface of the lamp, a diffusion sheet on the top surface of the light guide, and a reflection sheet on the bottom surface of the light guide. The light guide uniformly scatters rays irradiating from the ramp such that rays are uniformly incident on the diffusion sheet. The reflection sheet reflects rays directed opposite to the diffusion sheet such that most of the rays from the lamp are incident on the diffusion sheet. The diffusion sheet diffuses the rays to provide a uniform luminance throughout a light exit surface of the diffusion sheet. Additionally, a set of two prism sheets is beneficially disposed on the light exit surface of the diffusion sheet. The prism sheet set selectively changes the light rays as they pass through the sheets such that the luminance is enhanced at a particular viewing angle range. The rays from the prism sheet set are incident to the liquid crystal display panel of the liquid crystal display device such that images are displayed.

A mold frame of the liquid crystal display device supports the back light unit including the above-mentioned sheets and lamp such that the liquid crystal display panel and back light unit are fixed with each other in a fixing structure. However, as the liquid crystal display device becomes thinner and thinner, the fixing or supporting structure of the above-mentioned back light unit including the light guide et al. becomes more difficult to design. That is to say, a space for fixing the back light unit is so limited that a merely normal impact may break the fixing structure of the back light unit.

With reference to FIGS. 1 and 2, a conventional fixing structure of the back light unit will now be provided. FIG. 1 is a plan view illustrating a lower frame made from a plastic with a molding, and FIG. 2 is a cross-sectional view illustrating how the back light unit is assembled with the conventional lower frame in a typical liquid crystal display module.

As shown in FIG. 2, a typical liquid crystal display module 10 includes an upper frame 20 and a lower frame 30, which oppose each other. A liquid crystal display panel 60 and a back light unit 40 are disposed between the upper and lower frames 20 and 30. The liquid crystal display panel 60 includes first and second substrates (not shown) and a liquid crystal layer (not shown) sandwiched therebetween. The back light unit 40 is the edge type and includes a lamp 44, a light guide 42, a reflection sheet 48, a diffusion sheet 45, and a prism sheet 46. A panel guide 50 is further interposed between the upper and lower frames 20 and 30 and supports the liquid crystal panel 60.

As shown in FIG. 1, a conventional lower frame 30, having the lamp (reference 44 in FIG. 2) at a first side (a long side), includes a rib 32 at each second side (short side) perpendicular to the first side where the lamp is disposed. The ribs 32 fix the light guide 42. In addition, the lower frame 30 includes protrusions 34 at one of the second sides to fix the various sheets (reference 46 and the like in FIG. 2).

In assembling the back light unit 40 of FIG. 2 with the lower frame 30 of FIG. 1, at first, the lamp 44 is disposed on a long side of the lower frame 30. Then, the reflection sheet 48 is mounted on the lower frame 30, and the light guide 42 is mounted on the reflection sheet 48. Thereafter, the diffusion sheet 45 and prism sheet 46 are sequentially mounted on the light guide 42. At this point, a double-coated tape (not shown) is used between the diffusion and prism sheet 45 and 46 to fix their relative position.

Returning to FIG. 1, the ribs 32 and protrusions 34 serve to fix the light guide 42, diffusion and prism sheets 45 and 46 (see FIG. 2) such that a defect due to a movement thereof is prevented. Specifically, the ribs 32 prevent the movement of the light guide 42, and the protrusions 34 prevent movement of the diffusion and prism sheets 45 and 46. Each protrusion 34 has a cylindrical shape and protrudes upward from the rib 32 disposed at one of the second sides of the lower frame 30.

Meanwhile, the number of lamps used in the conventional art is increased in order to improve the brightness of the large scale LCD device, and thus the power consumption increases. However, some problems occur in the LCD device because of the heat from the lamp as well as a printed circuit board (PCB), which is conventionally interposed between the upper and lower frames and electrically connected with the liquid crystal display panel. That is to say, the lower frame is conventionally made with plastic molding, and since plastic has poor thermal radiation and conductivity properties, heat from the lamp or PCB cannot be conducted or radiated away. This causes heating of the liquid crystal display panel, a deterioration of luminance, and a wrinkle in the sheets.

To solve the problems caused by the heat, the lower frame 30 is beneficially made of a metallic material, usually aluminum (Al) that has good thermal conductivity and good thermal radiation. However, at this point, since the rib and protrusions are difficult to form on a metallic lower frame, additional elements are needed to fix the light guide and sheets.

SUMMARY OF THE INVENTION

Accordingly, the present invention is directed to an LCD module that substantially obviates one or more of the problems due to limitations and disadvantages of the related art, while retaining its advantages.

An object of the present invention is to provide an LCD module having an effective fixing structure to fix a light guide and various sheets of a back light unit.

Another object of the invention is to provide an LCD module that improves heat transfer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the present invention provides a liquid crystal display module which includes: a back light unit device having a) a lamp, b) a reflection sheet reflecting light from the lamp, c) a light guide positioned over the reflection sheet, the light guide having grooves at opposing sides, and d) a plurality of sheets located over the light guide, each sheet having a through hole corresponding to the grooves of the light guide; a liquid crystal panel located over the back light unit; a first frame located over the liquid crystal panel; a second frame having a) a main portion under the back light unit, b) first and second wall portions perpendicular to the main portion and disposed on sides of the main portion, and c) supporting portions extending outwardly from the first and second wall portions and parallel to the main portion, the supporting portions having first fastening means; and a fixing unit having a) pressing portions parallel to the supporting portions of the second frame, the pressing portions pressing down the grooves of the light guide, b) protrusions protruded upward from the pressing portions, the protrusions being inserted into the through holes of the plurality of sheets, and c) a connecting portion parallel to the supporting portion of the second frame, the connecting portion having a second fastening means for fastening with the first fastening means of the second frame.

The first fastening means of the second frame is beneficially a screw hole, the second fastening means of the fixing unit is beneficially a through hole, and beneficially a fastener such as a bolt or screw is driven into the screw hole and the through hole such that the second frame and fixing unit are assembled. The protrusions and pressing portions of the fixing unit are integrally formed.

The fixing unit is beneficially plastic, while the second frame is beneficially made of metal.

A lower surface of the groove of the light guide is on the same plane as an upper surface of the supporting portion of the second frame, and a lower surface of the pressing portion of the fixing unit is on the same plane as a lower surface of the connecting portion of the fixing unit.

The groove of the light guide further includes an opening or notch opened in an outward direction, and the fixing unit further includes a perpendicular portion such that the opening in the groove receives the perpendicular portion.

The liquid crystal display module further includes a radiation plate, the radiation plate being disposed over the lamp of the back light unit and contacting the supporting portion of the second frame. The radiation plate beneficially is made of aluminum (Al).

The back light unit beneficially includes a plurality of lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to a preferred embodiment of the present invention, an example of which is illustrated in the accompanying drawings.

Figure 3:
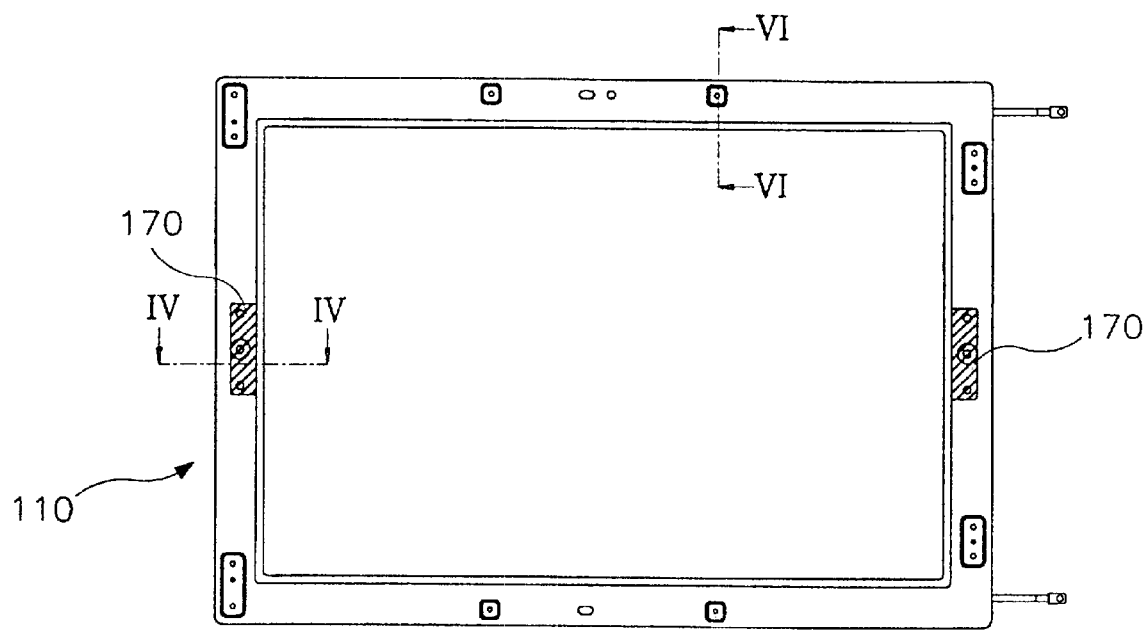
FIG. 3 is a plan view illustrating an LCD module according to a preferred embodiment.
Figure 4:
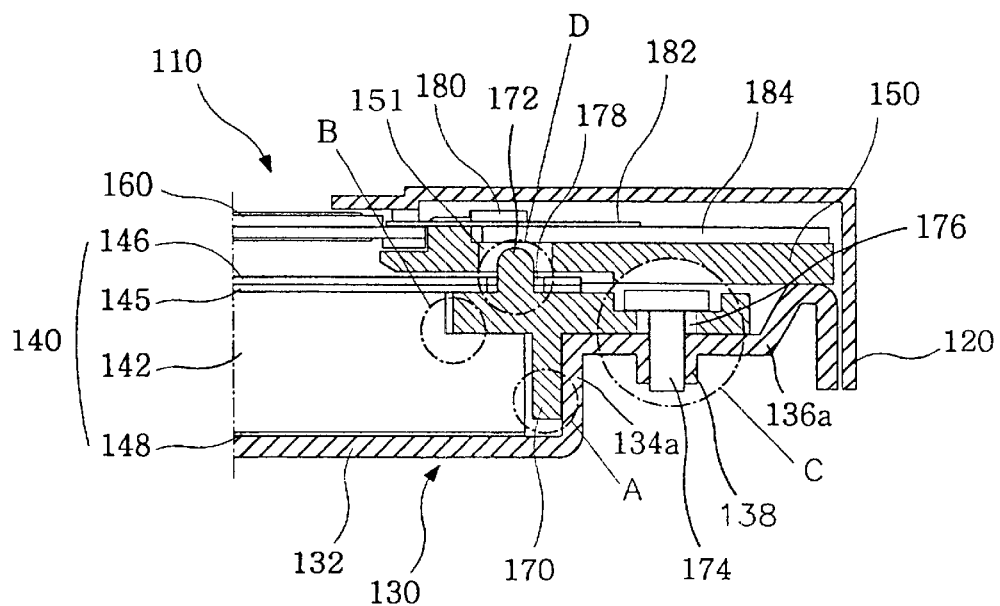
FIG. 4 is a cross-sectional view taken along a line "IV—IV" of FIG. 3.
Figure 6:
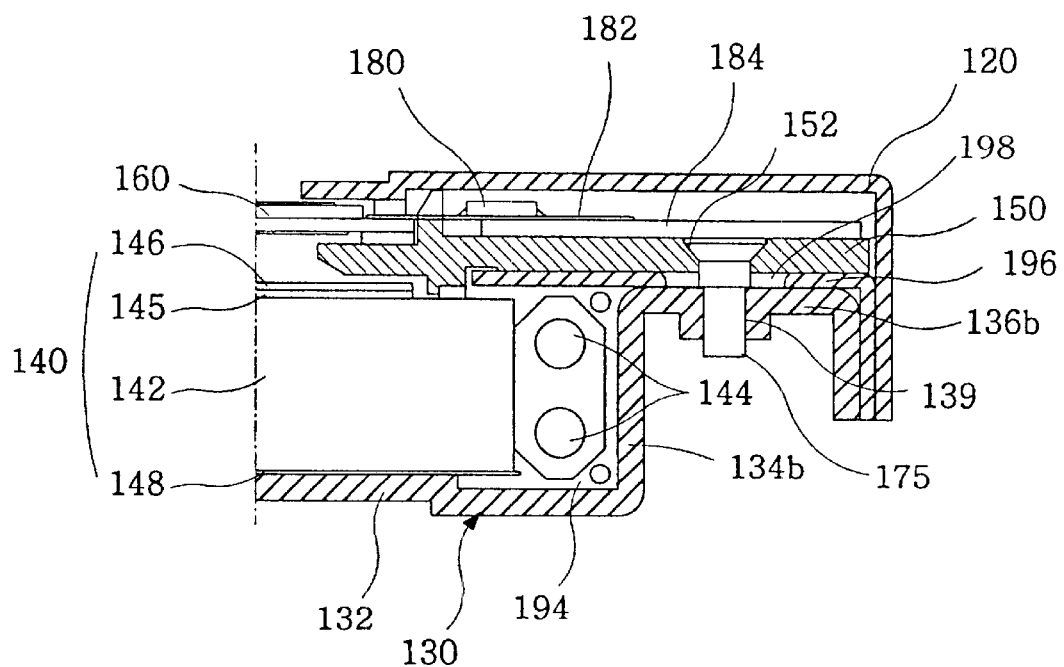
FIG. 6 is a cross-sectional view taken along line "VI—VI" of FIG. 3.

FIG. 3 is a plan view illustrating an LCD module 110 according to a preferred embodiment, and FIGS. 4 and 6 are cross-sectional view taken along lines "IV—IV" and "VI—VI" of FIG. 3, respectively. In FIG. 3, fixing units 170 are disposed on opposing side portions of the LCD module 110.

As shown in FIGS. 4 and 6, the LCD module 110 includes upper and lower frames 120 and 130, which oppose with each other, and a liquid crystal display panel 160 is interposed between the upper and lower frames 120 and 130. The lower frame has defined therein first screw holes 138 on first opposing sides where the fixing units 170 are disposed, and has defined therein second screw holes 139 on second opposing sides perpendicular to the first sides. A panel guide 150 is disposed below the upper frame 120 and supports the liquid crystal display panel 160 such that the liquid crystal display panel 160 is fixed between the upper and lower frames 120 and 130. Between the panel guide 150 and upper frame 120, a printed circuit board (PCB) 184 is disposed.

The PCB 184 is electrically connected with the liquid crystal display panel 160 via a tape carrier package (TCP) 182. The TCP 182 has an integrated circuit (IC) 180 mounted thereon. As shown in FIG. 6, the panel guide 150 has a counter-sunk hole 152 corresponding to the second screw hole 139 of the lower frame 130.

Returning to FIG. 4, a back light unit 140 is disposed below the liquid crystal display panel 160. The back light unit 140 includes a prism sheet 146, a diffusion sheet 145, a light guide 142, a reflection sheet 148, and lamps 144 (see FIG. 6). The fixing unit 170 is interposed between the lower frame 130 and panel guide 150, and serves to fix the back light unit 140. The fixing unit 170 is preferably made from plastic with a mold, while the upper and lower frames 120 and 130 are preferably made from metal. Since the upper and lower frames 120 and 130 are made from metal, heat produced from the PCB 184 and lamps 144 (reference FIG. 6) is easily radiated away to an ambient space.

As shown in FIGS. 4 and 6, the lower frame 130 includes a main portion 132 parallel to the liquid crystal display panel 160, first and second wall portions 134a and 134b perpendicular to the main portion 132, and first and second supporting portions 136a and 136b parallel to the main portion 132. The first and second supporting portions 136a and 136b extend outwardly from the first and second wall portions 134a and 134b, respectively. The first supporting portion 136a has the first screw hole 138 therein, and the second supporting portion 136b has the second screw hole 139 therein.

Figure 5:
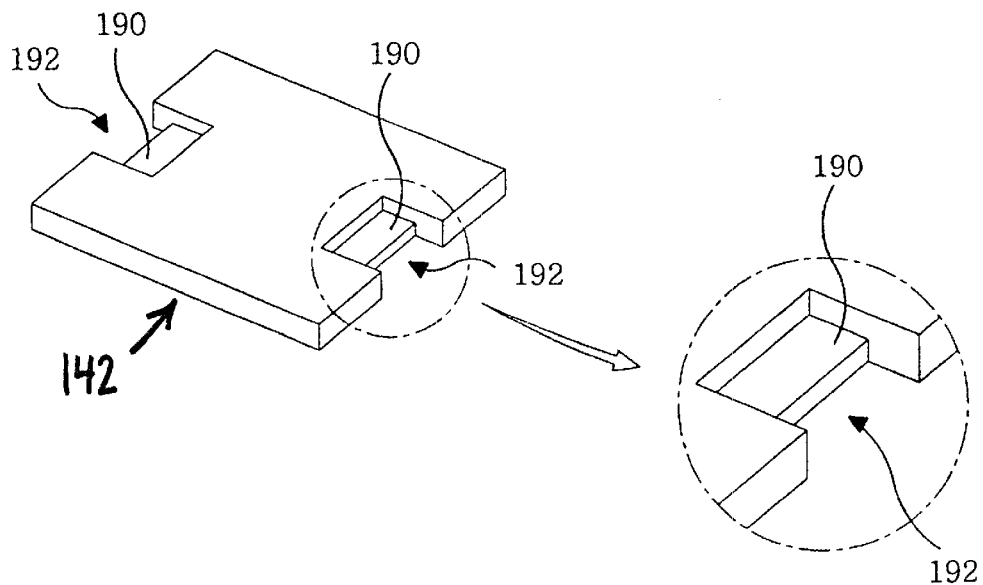
FIG. 5 is a perspective view illustrating a light guide according to a preferred embodiment.

As shown in FIG. 6, on a crossing edge between the main portion 132 and second wall portion 134b, a plurality of lamps 144, preferably two lamps, are sequentially disposed. The light guide 142, as shown in FIG. 5, has grooves 190 at its opposing ends, and each groove 190 has an opening or notch 192 at its end.

Returning to FIG. 4, the prism sheet 146 and diffusion sheet 145 have through holes 178 corresponding to a protrusion 172 of the fixing unit 170. The fixing unit 170 has a first fixing portion, or a perpendicular portion "A" that extends parallel to the first wall portion 134a of the lower frame 130, and a second fixing portion, or a pressing portion "B" that extends parallel to the first supporting portion 136a of the lower frame 130. In addition, the fixing unit 170 has a third fixing portion, or a connecting portion "C" that also extends parallel to the first supporting portion 136a of the lower frame 130. The third fixing portion "C" includes a through hole 176 that corresponds to the first screw hole 138 of the lower frame 130. The second and third fixing portions "B" and "C" preferably have the same lower surface. Furthermore, the fixing unit 170 has a fourth fixing portion, or a holding portion "D" including the protrusion 172 protruded in an upward direction from the second fixing portion "B". The protrusion 172 corresponds to the through holes 178 of the prism and diffusion sheets 146 and 145. Preferably, the first to fourth fixing portions "A" to "D" are integrally formed from plastic with mold.

For assembly of the LCD module 110, at first, a lamp housing 194 receiving the lamps 144 is mounted on one inner edge of the lower frame 130, as shown in FIG. 6. The lamp housing 194 directly contacts the main and second wall portions 132 and 134b of the lower frame 130 such that heat from the lamps 144 radiates away to an ambient space via the lower frame 130. That is to say, since the lower frame 130 is made of metal and directly contacts the lamp housing 194, heat from the lamps 144 is effectively transferred to the ambient space.

Then, returning to FIG. 4, the reflection sheet 148 is installed on the lower frame 130 such that the reflection sheet 148 can reflect incident rays from the lamps 144 (see FIG. 6) to the liquid crystal display panel 160. The reflection sheet 148 is preferably made from polyester. On the reflection sheet 148, the light guide 142 is installed such that the incident rays from the lamps 144 (see FIG. 6) uniformly irradiate to the liquid crystal display panel 160.

Thereafter, the first fixing portion "A" of the fixing unit 170 is inserted into a gap between the opening 192 of the light guide 142 and the first wall portion 134a of the lower frame 142. At this point, the second fixing portion "B" of the fixing unit 170 contacts an upper surface of the groove 190 of the light guide 142. Then, a first fastener 174, such as a screw or bolt, is driven through the through hole 176 and first screw hole 138, each providing fastening means, such that the fixing unit 170 is fixed on the lower frame 130 with a proper pressure acting thereon. The pressure from the first screw 174 further acts on groove 190 of the light guide 142 via the second fixing portion "B" of the fixing unit 170. That is to say, the pressure from the first screw 174 further acts on the light guide 142 such that the light guide 142 is fixed to the lower frame 130 with a proper pressure.

Thereafter, the diffusion sheet 145 and prism sheet 146 are sequentially installed on an upper surface of the light guide 142. At this point, the protrusion 172 of the fixing unit 170 is inserted into the through holes 178 of the diffusion and prism sheets 145 and 146 at the same time. Therefore, vibration or movement of the diffusion and prism sheets 145 and 146 is prevented due to the fixing unit 170.

Thereafter, as shown in FIG. 6, a radiation plate 196 is disposed to contact both the second supporting portion 136b of the lower frame 130 and the lamp housing 194 such that heat from the lamps 144 are radiated away via the radiation plate 196. The radiation plate 196 preferably has a high heat-conduction rate, and has a through hole 198 corresponding to the second screw hole 139 of the lower frame 130.

Thereafter, the panel guide 150 is mounted on the lower frame 130 such that the radiation plate 196 is present between the panel guide 150 and lower frame 130. As previously explained, the panel guide 150 has the counter-sunk hole 152 that corresponds to the second screw hole 139 of the lower frame 130. In addition, the panel guide 150 has a through hole 151 that corresponds to the protrusion 172 of the fixing unit 170 such that the protrusion 172 of the fixing unit 170 is not affected by the panel guide 150. At this point, a second fastener 175, such as a screw or bolt, is driven into the counter-sunk hole 152 of the panel guide 150, the through hole 198 of the radiation plate 196, and the second screw hole 139 of the lower frame 130, each of the holes providing fastening means. Therefore, the panel guide 150 and radiation plate 196 are fixed to the lower frame 130.

Thereafter, the liquid crystal display panel 160 and PCB 184 are installed on the panel guide 150. The liquid crystal display panel 160 and PCB 184 are connected via the TCP 182 having the IC 180.

Figure 1:
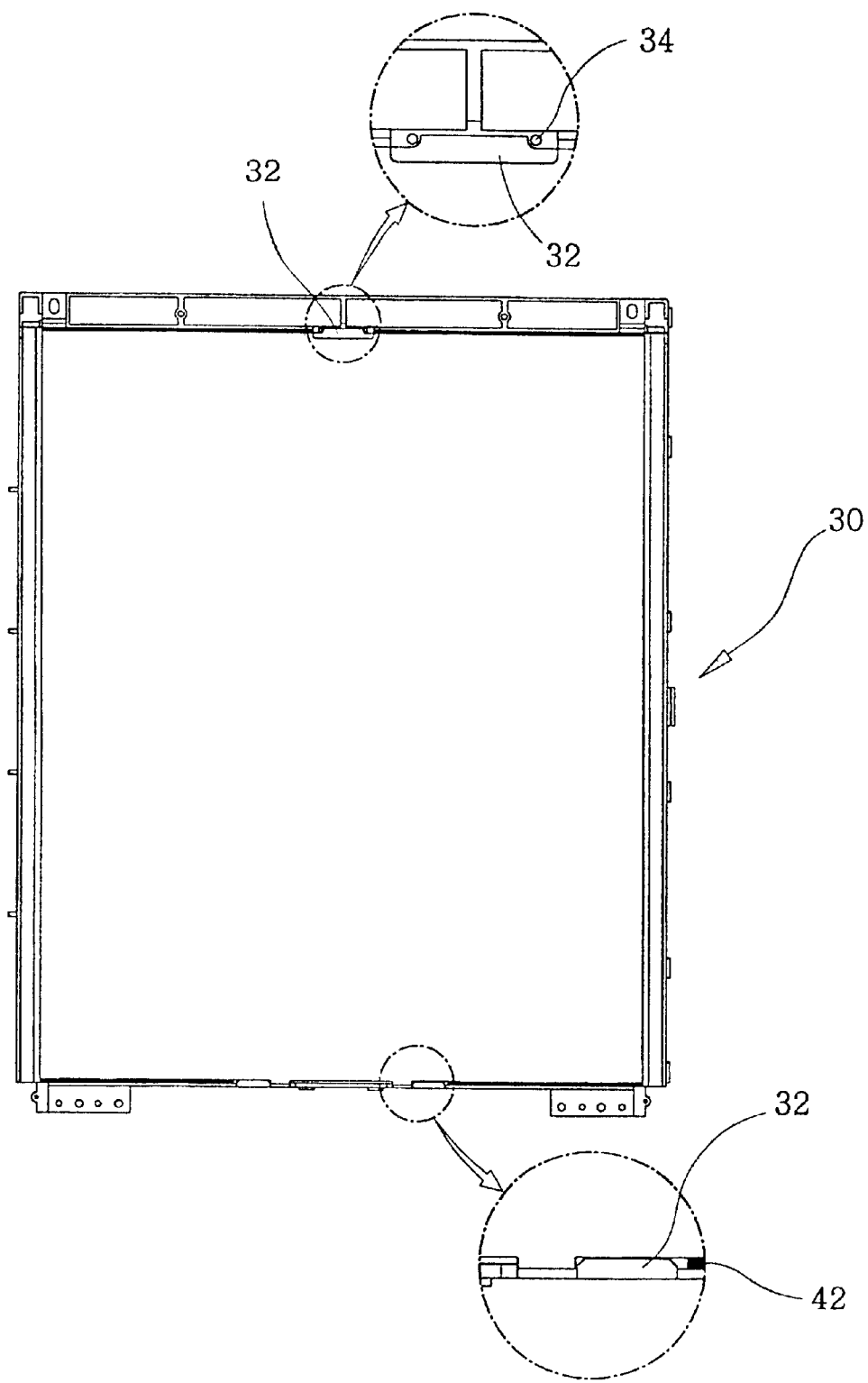
FIG. 1 is a plan view illustrating a lower frame according to the related art.
Figure 2:
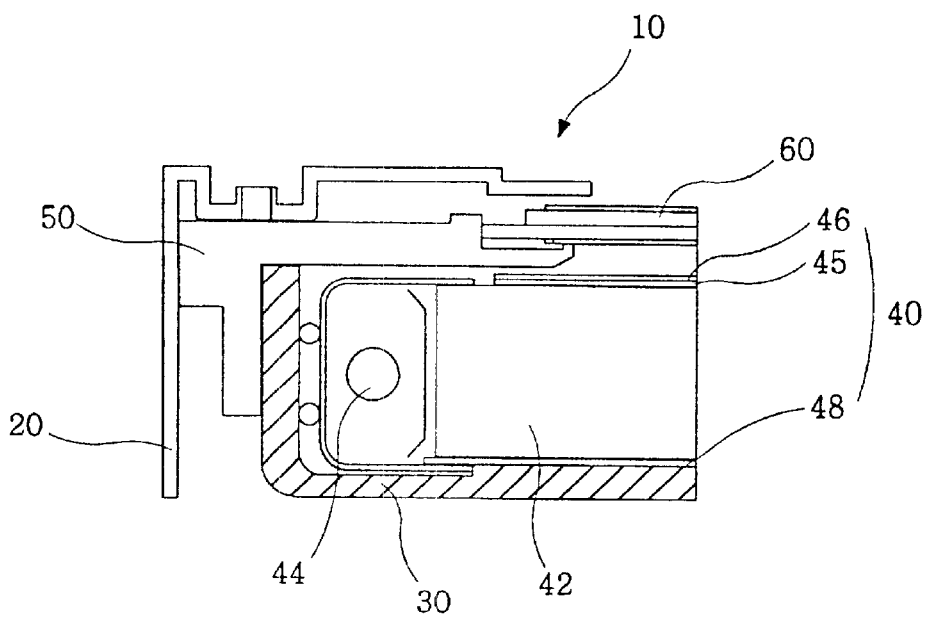
FIG. 2 is a cross-sectional view of a conventional LCD module.

Finally, the upper frame 120 is fixed to the lower frame 130 via screws or the like such that side edges of the liquid crystal display panel 160 are fixed between the upper frame 120 and panel guide 150. Since the upper frame 120 is made from metal, heat from the PCB 184 is effectively emitted away via the metallic upper frame 120 more than in the case of a conventional plastic upper frame shown in FIG. 2.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module comprising:
   a back light device having
   a) a lamp,
   b) a reflection sheet reflecting light from the lamp,
   c) a light guide positioned over the reflection sheet, the light guide having grooves at opposing sides, and
   d) a plurality of sheets located over the light guide, each sheet having a through hole corresponding to the grooves of the light guide;
   a liquid crystal display panel located over the back light unit;
   a first frame located over the liquid crystal display panel;
   a second frame having
   a) a main portion under the back light unit,
   b) first and second wall portions perpendicular to the main portion and disposed on sides of the main portion, and
   c) supporting portions extending outwardly from the first and second wall portions and parallel to the main portion, the supporting portions having first fastening means; and
   a fixing unit having
   a) pressing portions parallel to the supporting portions of the second frame, the pressing portions pressing down the grooves of the light guide,
   b) protrusions protruded upward from the pressing portions, the protrusions being inserted into the through holes of the plurality of sheets, and
   c) a connecting portion parallel to the supporting portion of the second frame, the connecting portion having a second fastening means for fastening with the first fastening means of the second frame.

2. The module of claim 1, wherein the first fastening means of the second frame includes a screw hole, the second fastening means of the fixing unit includes a through hole, and a bolt is driven into said screw hole and said through hole such that the second frame and fixing unit are assembled.

3. The module of claim 1, wherein the protrusions and pressing portions of the fixing unit are integrally formed.

4. The module of claim 3, wherein the fixing unit is plastic.

5. The module of claim 1, wherein the second frame is metal.

6. The module of claim 1, wherein a lower surface of the groove of the light guide is in a same plane as an upper surface of the supporting portion of the second frame, and a lower surface of the pressing portion of the fixing unit is in a same plane as a lower surface of the connecting portion of the fixing unit.

7. The module of claim 1, wherein the groove of the light guide further includes an opening, and the fixing unit further includes a perpendicular portion such that the opening receives the perpendicular portion.

8. The module of claim 1, further comprising a radiation plate, the radiation plate being disposed over the lamp of the back light unit and contacting the supporting portion of the second frame.

9. The module of claim 8, wherein the radiation plate is aluminum (Al).

10. The module of claim 8, wherein the radiation plate a through hole and the supporting portion of the second frame further comprises a screw hole, and wherein the radiation plate is attached to the second frame by means of a bolt inserted through the and screwed into the screw hole.

11. The module of claim 1, wherein the back light unit includes a plurality of lamps.

12. A liquid crystal display (LCD) module comprising:
    an LCD panel;
    a first frame located over the LCD panel;
    a second frame having
    a) a bottom portion,
    b) first and second wall portions extending from and generally perpendicular to the bottom portion, and
    c) supporting portions extending outwardly from the first and second wall portions and generally parallel to the bottom portion,
    a backlight unit having
    a) a lamp,
    b) a reflection sheet reflecting light from the lamp and residing on the bottom portion of the second frame,
    c) a light guide positioned over the reflection sheet, the light guide having grooves at opposing sides, and
    d) a plurality of sheets located over the light guide and beneath the LCD panel;
    and
    a fixing unit having
    a) pressing portions pressing down the grooves of the light guide, and
    b) a connecting portion fastened to at least one of the supporting portions of the second frame.

13. The LCD module of claim 12, wherein the connecting portion of the fixing unit includes a first hole, the at least one supporting portion of the second frame includes a second hole, and the connecting portion of the fixing unit is fastened to the at least one supporting portion of the second frame by inserting a fastener through the first and second holes.

14. The LCD module of claim 12, further comprising a radiation plate residing on and fastened to a second one of the supporting portions of the second frame.

15. The LCD module of claim 14, further comprising a panel guide residing beneath the LCD panel and above the radiation plate and fastened to the radiation plate.

16. The LCD module of claim 15, wherein the plurality of sheets each have a through hole, and wherein the fixing unit further comprises a protrusion extending upward through each of the through holes.

17. The LCD module of claim 15, wherein the panel guide includes a first hole, the radiation plate includes a second hole, the second one of the supporting portions of the second frame includes a third hole, and wherein panel guide is fastened to the radiation plate and the radiation plate is fastened to the second one of the supporting portions of the second frame by inserting a fastener through the first, second, and third holes.

18. The LCD module of claim 14, wherein the connecting portion of the fixing unit includes a first hole, the at least one supporting portion of the second frame includes a second hole, and the connecting portion of the fixing unit is fastened to the at least one supporting portion of the second frame by inserting a fastener through the first and second holes.

19. The LCD module of claim 12, wherein the plurality of sheets each have a through hole, and wherein the fixing unit further comprises a protrusion extending upward through each of the through holes.

* * * * *